United States Patent Office 3,051,008
Patented Aug. 28, 1962

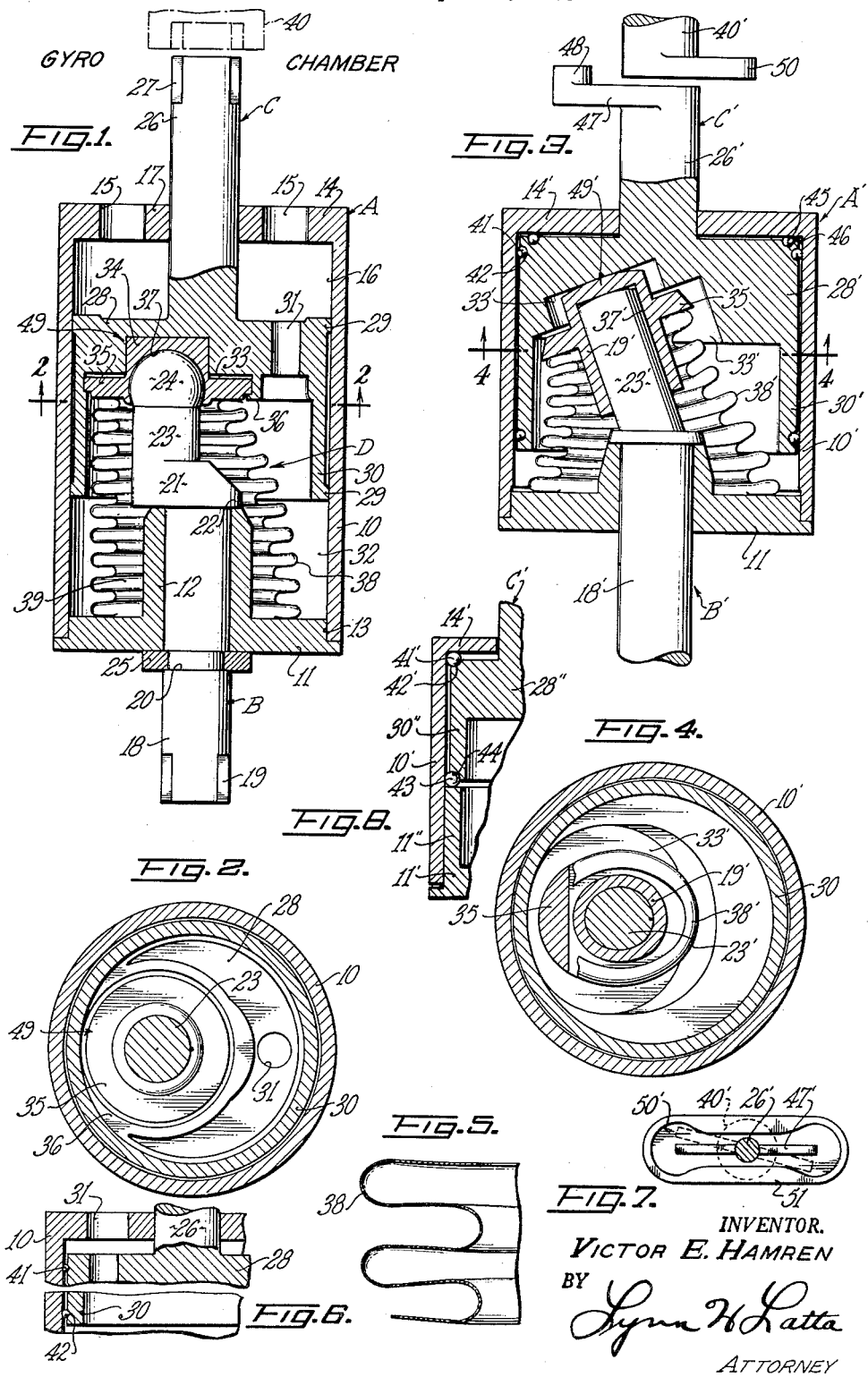

3,051,008
HERMETICALLY SEALED ROTARY DRIVE
COUPLING
Victor E. Hamren, Los Angeles, Calif., assignor to Mech-Metal Ironics, Inc., New York, N.Y., a corporation of Delaware
Filed Sept. 22, 1960, Ser. No. 57,743
16 Claims. (Cl. 74—18.1)

This invention relates to rotary drive couplings and has as its general object to provide a hermetically sealed rotary drive coupling which can be of very small proportion, for example, as small as ⁵⁄₁₆ inch axial length and ⁵⁄₁₆ inch diameter for a shaft seal having shaft elements as small as .03 inch diameter rotatably coupled to one another with an interposed complete hermetic seal.

The invention is useful in gyro equipment and other fluid filled devices, wherein the coupling is utilized to transmit adjustments from an external knob or other actuator to a rotatably adjustable part sealed within a fluid filled housing, or within an evacuated housing.

A further object of the invention is to provide such a sealed shaft coupling providing for both rotary and axial adjustments of coupled shaft elements while maintaining a perfect fluid seal between them.

More specifically, the invention contemplates a sealed shaft coupling adapted for transmitting from an external drive shaft unit to an internal driven shaft unit, sealed within the fluid filled housing of a gyro or other device, rotating movements for effecting rotation of said internal part.

In the application to a gyro, the invention provides an adjustment transmitting device which can be sealed in the wall of the fluid-containing case of the gyro and which, at its inner extremity, provides an actuator device which can be extended into adjustment-transmitting engagement with an adjustment device in the frame structure of the gyro gimbal which floats in the body of liquid contained in the gyro case, and must not be subjected to positional restraint such as would be imposed upon it by a mechanical adjustment device bridging between the outer case and the gimbal and permanently connected to the gimbal. The commonly used device for adjusting the gimbal is a series of adjustable counterweights in the frame structure of the gimbal, and the invention provides a retractable adjuster which can be moved into engagement with a respective counterweight, can be actuated to adjust the counterweight, and then can be retracted away from physical engagement with the counterweight and the gimbal so as to leave the gimbal in its normal floating condition. Many other applications of the invention, where it provides a sealed rotary adjustment transmitting device, sealed in the wall of an outer casing and selectively engageable with and retractable from a device that is sealed within the outer casing, are possible.

Other objects and advantages will become apparent in the ensuing specification and appended drawings in which:

FIG. 1 is an axial sectional view of a sealed shaft coupling embodying one form of my invention;

FIG. 2 is a transverse sectional view thereof taken on the line 2—2 of FIG. 1;

FIG. 3 is an axial sectional view of a sealed shaft coupling embodying another form of the invention;

FIG. 4 is a transverse sectional view thereof taken on the line 4—4 of FIG. 3;

FIG. 5 is a fragmentary sectional view of the bellows seal element on an enlarged scale;

FIG. 6 is a fragmentary sectional view of another modified form of the invention;

FIG. 7 is a detailed view of a modified form of coupling means; and

FIG. 8 is a fragmentary sectional view of another modification.

Referring now to the drawing in detail, and in particular to FIGS. 1 and 2, I have shown therein, as an example of one form in which the invention may be embodied, a sealed shaft coupling comprising, in general, a housing A, a drive shaft unit B, a driven shaft unit C and a seal unit D.

The housing A comprises a tubular barrel 10 which may be sealed and secured (as by soldering) into a suitable passage or bore in the wall of a liquid containing housing, or in a bulkhead or an instrument panel, depending upon the use to which the coupling is to be placed. Preferably, the barrel 10 has a cylindrical external wall to fit snugly within the bore in the mounting wall, so that the housing A can be hermetically sealed in such mounting wall as by sweating. The outer end of barrel 10 is closed by a cap 11 having an integral bearing bushing 12 projecting into the housing. The cap 11 is sealed to the barrel 10, preferably by having a cylindrical shoulder 13 sweated or welded or cemented into the bore of barrel 10 which is preferably cylindrical. At its opposite end, barrel 10 has an end spider 14 provided with apertures 15 to establish communication between the interior of the fluid filled gyro housing or the like, and a chamber 16 which is defined in the inner end of the housing A. The central portion of spider 14 constitutes a bearing 17 which has a cylindrical bearing bore.

The drive shaft unit B includes a shaft 18 which has, in its outer end, means 19 for coupling it to an actuator knob (not shown) or other actuator part by means of which actuator movements can be transmitted to the shaft unit B. Shaft 18 is mounted in the end cap bushing 12 for both rotating and axially sliding movement, and has an annular groove 20, and a crank arm 21 integral with and projecting radially from its inner end. Crank arm 21 has a flat shoulder 22 abutted against the inner end of bushing 12, and an eccentric crank pin 23 projecting inwardly from the end of arm 21 and terminating in a segmental spherical ball tip 24. A snap ring 25 is normally engaged in the annular groove 20 and abuts the outer end face of end cap 11, cooperating with the shoulder 22 in normally retaining the shaft unit B against endwise movement with relation to the end cap 11.

Snap ring 25 is of a suitable type providing for easy removal thereof to permit the drive shaft unit B to be projecting inwardly with respect to housing A, to transmit corresponding projecting movements to driven shaft unit C in order to effect coupling thereof to an adjustment part 40 within the sealed casing within which the housing A is mounted.

The driven shaft unit C comprises a shaft 26 having at its end, means 27 for driving engagement with an adjustment part 40 or the like, within the fluid filled gyro case or the like. Integral with the end of shaft 26 is a head 28 which has cylindrical peripheral bearing lands 29 defined at the respective sides of a shallow cylindrical peripheral groove in head 28 for reducing the frictional drag of the head against the cylindrical inner wall of the barrel 10. Head 28 preferably includes a skirt 30 which extends axially to provide adequate axial spacing between the annular bearing lands 29, for maximum support of the driven shaft unit C against cocking within housing A. In the head 28 is one or more apertures 31 establishing communication between the chamber 16 and a chamber 32 which is defined between the head 28 and the end cap 11 around the seal unit D. The skirt 30 extends into the annular chamber 32 which surrounds a portion of the length of seal unit D.

In the outer face of head 28 is a cylindrical hat shaped recess 33 in which is socketed (for oscillating movement)

a coupling part 49 which includes a cylindrical head 34 and a radial flange 35, the latter being received in the flat shallow cylindrical rim portion of recess 33 and retained by an overhanging thin radial lip 36 at the mouth thereof. The flange 35 of coupling part 49, and the head portion 34 thereof, have axial clearance within their respective portions of the recess 33 to minimize frictional resistance to rotation of coupling part 49 within the recess during operation of the device. Within the coupling part 49 is a segmental spherical socket 37 receiving the ball tip 24 of eccentric crank finger 23. Socket 37 is extended by means of a marginal lip thereof, beyond its equator so as to provide a push-pull coupling with ball tip 24.

The seal unit D includes the coupling part 49 together with an extremely thin walled bellows sleeve 38 one end of which is secured and sealed to the outer face of flange 35 and the other end of which is secured and sealed to the inner face of end cap 11. Defined within bellows 38 is an air-filled chamber 39 which is not necessarily sealed from external atmosphere but on the other hand does not require a bleed connection to atmosphere, since the compressibility of the air will accommodate the extension and contraction of the bellows. Bellows sleeve 38 preferably tapers from maximum diameter at its outer end to minimum diameter at its inner end. It is composed of an extremely thin film of electroless (chemically deposited) heat treated nickel alloy (preferably a nickel-phosphorus alloy) having a wall thickness within the range of .0002 inch up to .005 inch, having a low spring rate, high ratio of deflection range to free length, and low hysteresis, high elasticity properties, i.e. the ability to faithfully return to a normal configuration after having been deflected therefrom, with negligible permanent deformation. It is further characterized by having a uniform wall thickness throughout both its flat areas and its sharply curved areas (in the radially outward and inward limits of its convolutions). This uniformity of wall thickness is attained by depositing a nickel onto a pattern out of a plating solution including an aqueous solution of a nickel salt and a hypophosphite (e.g. a mixture of nickel sulfate and sodium hypophosphite) maintained at a temperature of 90° to 100° centigrade and a pH of 4 to 6. After depositing the selected wall thickness, the pattern, with the film adhering thereto, is removed from the plating solution and is washed, and is then subjected to heat treating at approximately 350° F. for normalizing and developing maximum properties therein.

Subsequently the pattern is removed from the plated shell by an etching process (or by melting it out if a suitable pattern material is used—one that will melt at a temperature below that which would damage the shell). After removal of the pattern, the shell is chemically cleaned both internally and externally and is preferably gold-plated to render it inert to any corrosive action of the liquid within the instrument in which the coupling is used.

In spite of the extremely high flexibility and the extreme wall thinness of the bellows, it has remarkably high strength in the smaller sizes, in resisting fluid pressure differentials while effecting no appreciable resistance to the actuation of the parts which it seals.

It will be understood that in the normal liquid filled instrument such as a gyro, it is customary to utilize some type of compensation device for compensating the displacement of liquid arising through thermal expansions and contractions. Liquid displacement arising from the extension of bellows 38 in the operation of the device of this invention, must likewise be compensated by a displacement absorption yielding device. A bellows in the form of a closed capsule, embodying the extremely thin walled uniform wall thickness and high flexibility of the bellows 38, is especially useful for this purpose, and the invention in its broad aspects, as it involves the thin walled, chemically deposited structure of bellows 38, contemplates such an application. Other applications of this improved bellows will become apparent to those skilled in the art and are likewise contemplated by the invention.

In the operation of the coupling, rotation transmitted to drive shaft unit B will be transmitted through ball tip 24 to the coupling part 49 and thence to the head 28 of the driven shaft unit C from which it will be transmitted to a sealed internal part. The normal shape of the bellows element 38 is conical, symmetrically about the axis of trunnion 18. However, it is constantly flexed to one side of its symmetrical axis by the eccentric relation between its base where it is attached to the cap 11 and its inner end where it is attached to the coupling part 49 which is always eccentric to the base 11. The lateral deflection of the bellows element 38 will change direction around the orbit of eccentric movement of the coupling part 49 as the drive shaft unit B is rotated. The rotation of the unit B is transmitted to the unit C through the eccentric connection between ball tip 24 and coupling part 49, eccentrically positioned in head 28. For each increment of rotation of drive shaft unit B around its axis, there will be a corresponding increment of rotation of driven shaft C around the common axis of shaft B and C, the same number of degrees.

At this point it should be noted that when the device is not in use, driving and driven shaft units B and C are retracted to the positions shown in FIG. 1, the coupling end 27 of driven unit C being disengaged from the adjustment part 40 to which it is designed to transmit adjustment rotation. The device is installed in the gyro housing or the like, with the wrenching tip 27 in opposed coaxial relation to a corresponding socket in the adjustment part that is to be actuated.

When an adjustment operation is to be performed, the snap-ring 25 is removed from the groove 20 and the drive shaft unit B is projected inwardly, shifting the coupled assembly of units B and C axially, with the driven unit head 28 advancing in the free space in chamber 16 which accommodates such projecting movement. Correspondingly the wrenching tip 27 of driven shaft 26 will be projected into coupling engagement with the part that is to be adjusted. The coupled assembly of driving and driven units B and C is then rotated, rotation being transmitted by a knob or other device to wrenching end 19 of shaft 18 and from wrenching tip 27 to the part being actuated. When the proper amount of adjusting movement has been transmitted, the drive shaft unit B is retracted outwardly to the position shown in FIG. 1, the snap ring 25 is replaced in the groove 20, and the assembly of driven units B and C is thus retained in the retracted position so that there is no possibility of the tip 27 being jarred back into obstructing engagement with the floating part within the sealed housing of the apparatus in which the device is installed.

Any leakage between the internal chamber 39 within bellows 38 and external atmosphere will have no effect upon the sealed condition of the coupling. The chamber 32, communicating with the interior of the instrument in which the coupling is installed, will be completely sealed off from the exterior by the sealed joints between the ends of the bellows element 38 and the cap 11 and flange 35 respectively, the coupling part 49 completely closing the inner end of the bellows element 38.

Because of the low spring rate, extremely high flexibility, evenness of wall thickness, and low hysteresis of the bellows element 38, it will offer no appreciable resistance to the rotation of the two shaft members, and will accommodate itself to any position of rotation at which the movement of the shafts may be stopped.

FIG. 6 illustrates a modification of the invention which can be employed in larger units (e.g. upwards of ⅜ of an inch diameter) wherein bearing balls 41, arranged in respective annular arrays near adjacent ends of the head 28, are retained in annular grooves 42 in the head 28 and bear against the cylindrical inner wall of the housing barrel 10, in lieu of the cylindrical lands 29 of FIG. 1.

The form of the invention shown in FIG. 3 may also utilize bearing balls 41, disposed in grooves 42 in head 28'. Also, end bearing balls 45 may be arranged in a circumferential array in grooves 46 in head 28'.

The use of bearing balls as in FIGS. 3 and 6 is optional and is resorted to only in the units of larger size. In the smaller units, below ⅜ inch diameter, rotatable engagement of cylindrical lands 29 against the cylindrical inner wall of the skirt 10 is resorted to.

FIG. 3 illustrates a modified form of the invention wherein the assembly of driving shaft units B' and driven shaft unit C' do not have any axial movement in the housing A'. However, the shaft 26' of the driven unit C' has a circumferentially separable driving connection with the part 40' that is to be adjusted, in the form of a crank finger 47 on the end of shaft 26', terminating in a driving tip 48 projecting axially into the plane of a drive receiving lever 50 projecting radially from the adjustment part 40'. The adjustable part 40' is mounted for rotation on a common axis with driven unit C' and thus it is possible to rotate the driving tip 46' into engagement with the drive receiving lever 50, to transmit rotation to the part 40' through a portion of a revolution or through several revolutions if desired, and to then back the driving tip 48 circumferentially away from the drive receiving lever 50 so as to break the connection between the adjustment transmitting device of the invention and the floating assembly (such as a gimbal) of the host mechanism.

The head 28' of driven unit C' omits the port 31 of FIG. 1 since there is no requirement for fluid flow through the head. It also omits the retainer lip 36 of FIG. 1 since there is no push-pull transmission of axial motion between units B' and C'. Its socket receiving recess 33' may be disposed on a diagonal axis as shown, and the crank finger 23' of driving unit B' may be in the form of a straight trunnion extending diagonally from the end of shaft 18' as shown. Barrel 10' may be shorter than barrel 10, since it need provide no space for axial movement of the internal parts, and inner end member 14' can be imperforate except for the central bore in which shaft 26' is journalled. Bellows 38' may be somewhat shorter than bellows 38, since it is not required to be extended and contracted axially. Socket fitting 19' has a cylindrical socket recess 37' receiving the cylindrical end of crank finger 23'. Other parts, substantially the same as in the form shown in FIG. 1, are referred to by the same reference numerals as in FIG. 1.

In the modified coupling device shown in FIG. 7, the construction shown in FIG. 3 is modified by substituting for the crank 47 a driving key 47' on the end of shaft 26', and by utilizing a socket 50' in a head 51 on the end of shaft 40', the key 47' being constantly encompassed within the socket 50' but normally centered therein as shown in full lines, so as to leave the gyro shaft 40' completely unobstructed for normal gyro operation. When adjustment of the gyro is to be made, the shaft 26' is rotated until the ends of the key 47' establish driving engagement with the sides of socket 50' as indicated in broken lines in FIG. 7. At the completion of the adjusting movement, the key 47' is again centered, out of contact with the walls of socket 50'.

FIG. 8 discloses a further modification of the mechanism shown in FIG. 3, wherein, in lieu of bearing balls 41 and 45, there is provided an annular array of angular-contact balls 41' bearing in a corner race 42' at the end of head 28" and in the corner defined between barrel 10' and casing end 14'; and a second annular series of balls 43 bearing in a race 44 in the other end of head 28" and in an annular corner defined between skirt 10' and an integral sleeve extension 11" of cap 11'. In other respects the construction is as shown in FIG. 3.

Similar numerals in the respective figures designate generally similar parts, modifications thereof being indicated by the prime exponents on the reference numerals.

I claim:

1. A hermetically sealed shaft coupling of miniature proportions having length and diameter dimensions within a range of ½ inch maximum for transmitting rotation from an externally operable shaft through the wall of a sealed casing to a driven part sealed within said casing, said coupling comprising: a housing including a tubular barrel having an inner end member provided with a central bearing part, and a cap secured and sealed to the outer end of said barrel and having a central bearing; a seal unit comprising a coupling part having a socket open toward said outer end cap, and a bellows having a wall film of substantially uniform tissue thinness in the range of between .005 inch maximum and .0002 inch minimum, said film being of chemically deposited metal within the group including nickel, nickel phosphorus alloys, cobalt, and cobalt-phosphorus alloys, and said bellows having its inner end secured and sealed to said coupling socket and its outer end secured and sealed to said outer end cap; an externally operable drive shaft unit including a shaft journalled in said cap bearing and a crank on the inner end of said shaft, said crank being pivotally engaged in said coupling socket; and a driven shaft unit comprising a shaft journalled in said bearing part and extending into the inner end portion of said housing, and means, on the inward end of said driven shaft unit, having a rotary drive-receiving connection with said coupling part, said bellows and coupling part cooperatively sealing said drive shaft and its crank in external relation to the space around the bellows within said housing.

2. A coupling as defined in claim 1, wherein said bellows is of nickel-phosphorus alloy.

3. A coupling as defined in claim 1, wherein said bellows is of frusto-conical form and has its smaller end secured to said coupling part and its larger end secured to said outer end cap.

4. A hermetically sealed shaft coupling of miniature proportions having length and diameter dimensions within a range of ½ inch maximum for transmitting rotation from an externally operable shaft through the wall of a sealed casing to a driven part sealed within said casing, said coupling comprising: a housing adapted to be sealed in said casing wall, said housing having inner and outer end members provided with respective central bearings; a seal unit comprising a coupling part and a bellows having a wall film of substantially uniform tissue thinness in the range of .005 inch maximum and .0002 inch minimum, said film being of chemically deposited metal within the group including nickel, nickel phosphorus alloys, cobalt, nickel-cobalt alloys, and cobalt-phosphorus alloys, and said bellows having its inner end secured and sealed to said coupling part and its outer end secured and sealed to said housing; an externally operable drive shaft unit including a shaft journalled and axially slidable in said outer end member bearing and having a crank on its inner end, said crank being pivotally coupled to said coupling part; and a driven shaft unit comprising a shaft journalled and axially slidable in said inner end member bearing and extending into the inner end portion of said housing, and means, on the inward end of said driven shaft unit, having a rotary drive-receiving connection with said coupling part, said bellows and coupling part and outer end member cooperatively sealing said driven shaft unit within said housing, and said coupling part transmitting both rotary drive and axially sliding movement from said drive shaft to said driven shaft.

5. A hermetically sealed shaft coupling of miniature proportions having length and diameter dimensions of approximately ⅜ inch for transmitting rotation for an externally operable shaft through the wall of a sealed casing to a driven part sealed within said casing, said coupling comprising: a housing including a cylindrical tubular barrel adapted to be sealed in a bore in said casing wall, an integral inner end member provided with a central bearing part, and a cap removably secured and sealed to the outer end of said barrel; a seal unit comprising a coupling part having a bearing socket open toward said outer end cap and a frusto-conical bellows having a wall film of substantially uniform tissue thinness, of chemically deposited metal within the group including nickel, nickel phosphorus alloys, cobalt and cobalt-phosphorus alloys, said bellows having its smaller end secured and sealed to said coupling part and its larger end secured and sealed to said outer end cap, said cap having a central bearing bushing projecting into said bellows; an externally operable drive shaft unit including a shaft journalled in said integral bearing bushing and a crank on the inner end of said shaft, said crank being pivotally engaged in said coupling part bearing socket and being disposed within said bellows beyond the inner end of said bushing; and a driven shaft unit comprising a shaft journalled in said bearing part and extending into the inner end portion of said housing, and a means, on the inward end of said driven shaft unit, having a rotary drive-receiving connection with said coupling part, said bellows, outer end cap and coupling part cooperatively sealing said drive shaft and its crank in external relation to the space within said housing.

6. A hermetically sealed shaft coupling of miniature proportions having length and diameter dimensions within a range of ½ inch maximum and down to as small as ⅛ inch, for transmitting rotation from an externally operable drive shaft through the wall of a sealed casing to a driven part sealed within said casing, said coupling comprising: a housing including a cylindrical tubular barrel adapted to be sealed in a bore in said casing wall, an inner end member having a bearing bore, and an outer end member having an integral bearing bushing; a seal unit comprising a coupling part having a bearing socket open toward said outer end member, and a bellows having a wall film of tissue thinness in the range of between .005 inch maximum and .0002 inch minimum, and a uniform wall thickness within a maximum deviation of .00005 inch, said film being of chemically deposited metal within the group including nickel, nickel phosphorus alloys, cobalt, and cobalt-phosphorus alloys, and said bellows having its inner end secured and sealed to said coupling part and its outer end secured and sealed to said outer end member; an externally operable drive shaft unit including a shaft journalled in said bearing bushing and a crank on the inner end of said shaft, said crank being pivotally engaged in said bearing socket, and a driven shaft unit comprising a shaft journalled in said bearing bore and extending into said housing in the inner end portion thereof and means on the inward end of said driven shaft, projecting radially therefrom and coupled to said coupling part, said bellows and coupling part cooperatively sealing said drive shaft and its crank in external relation to the interior of said housing.

7. A hermetically sealed shaft coupling of miniature proportions having length and diameter dimensions within a range of ½ inch maximum and down to as small as ⅛ inch, for transmitting rotation from a drive shaft through the wall of a sealed casing to a driven part sealed within said casing, said coupling comprising: a housing including a tubular barrel having an integral inner end member having a central bearing bore, and a cap detachably secured and sealed to the outer end of said barrel and having an integral bearing bushing; a seal unit comprising a coupling part of that section including a flat radial rim and a cylindrical head projecting axially from said rim toward said inner end member, said coupling part having a bearing socket open toward said outer end cap, and a frusto conical bellows having a stress-relieved wall film of substantially uniform tissue thinness in the range of between .005 inch maximum and .0002 inch minimum, said film being of chemically deposited metal within the group including nickel and nickel phosphorus alloys, and said bellows having its smaller end secured and sealed to said coupling part and its larger end secured and sealed to said outer end cap; a drive shaft unit including an externally operable shaft journalled in said bearing bushing and a crank on the inner end of said trunnion portion, bearing against the end of said bearing bushing, said crank being pivotally engaged in said bearing socket, said bearing bushing and crank being disposed end-to-end within said bellows; and a driven shaft unit comprising a shaft journalled in said bearing bore of said inner end member and extending into said housing in the end portion thereof remote from said bellows, and means on the inward end of said driven shaft, projecting radially therefrom and having a recess receiving said coupling part and thereby coupled thereto, said bellows and coupling part cooperatively sealing said drive shaft and its crank in external relation to the interior of said housing.

8. A hermetically sealed shaft coupling of miniature proportions having length and diameter dimensions within a range of ½ inch maximum and down to as small as ⅛ inch, for transmitting rotation from an externally operable shaft through the wall of a sealed casing to a driven part sealed within said casing, said coupling comprising: a housing including a cylindrical tubular barrel adapted to be sealed in a bore in said casing wall, said housing having an inner end member having a central bearing bore, and means hermetically closing the outer end of said barrel and having a bearing bushing projecting into the barrel; a seal unit comprising a coupling part having a bearing socket open toward said outer end cap, and a frusto conical bellows having a wall film of uniform tissue thinness in the range of between .005 inch maximum and .0002 inch minimum, said film being of chemically deposited metal within the group including nickel, nickel phosphorus alloys, cobalt, and cobalt-phosphorus alloys, and said bellows having its smaller end secured and sealed to said coupling part and its outer larger end secured and sealed to said outer end cap; an externally operable drive shaft journalled in said bearing bushing and having a crank on its inner end, said crank being received in said socket and thus pivotally connected to said coupling part, said bearing bushing and crank being disposed within said bellows; and an inner driven shaft unit comprising a shaft section journalled in said bearing bore of said inner end member and extending into said housing in the end portion thereof remote from said bellows, and a cylindrical head on the inward end of said driven shaft section, having peripheral bearing means rotatably bearing on the cylindrical inner wall of said barrel, said bellows and coupling part cooperatively sealing said drive shaft and its crank in external relation to the interior of said housing.

9. A coupling as defined in claim 8, wherein said peripheral bearing means of the driven shaft head has annular bearing grooves adjacent respective axial extremities thereof; and an annular array of bearing balls retained in each of said bearing grooves and bearing against the inner wall of said barrel.

10. A coupling as defined in claim 8, wherein the coupled assembly of driven shaft head and driving shaft unit is retained between the respective end members of said housing in axially fixed relation to the housing.

11. A hermetically sealed shaft coupling of miniature proportions having length and diameter dimensions within a range of less than ½ inch maximum for rotation transmitting coupling and uncoupling with reference to a driven part sealed within a casing, said coupling comprising: a housing including a cylindrical tubular barrel having an inner end member in the form of a spider provided with an aperture and a central bearing part having a bearing bore, and a cap secured and sealed to the outer end of said barrel and having an integral bearing bushing; a seal unit comprising a coupling part having a segmental spherical recess open toward said outer end cap, and a frusto-conical bellows having a wall film of substantially uniform tissue thinness in the range of between .005 inch maximum and .0002 inch minimum, said film being of chemically deposited metal and having its smaller end secured and sealed to said coupling part and its larger end secured and sealed to said outer end cap; an externally operable drive shaft unit including a shaft slidably and rotatably journalled in said bearing bushing and a crank on the inner end of said shaft, said crank terminating in a segmental-spherical tip pivotally engaged in said segmental spherical recess to provide a rotational and push-pull axial movement-transmitting coupling between said crank and coupling part, said bearing bushing and crank being disposed within said bellows; and a driven shaft unit comprising a shaft journalled in said bearing bore of said spider and extending into said housing in the end portion thereof remote from said bellows, and a head on the inward end of said driven shaft section, projecting radially therefrom and having a cylindrical peripheral bearing means bearing on the cylindrical inner wall of said barrel, said head having an axial and rotational movement transmitting connection with said coupling part, and having an aperture providing communication between the space around said bellows and the space between said head and said spider and thus in communication with the interior of said sealed casing, said bellows and coupling part cooperatively sealing said drive shaft and its crank in external relation to the interior of said housing while accommodating axial shifting and rotation of the coupled drive and driven shaft units.

12. A hermetically sealed shaft coupling of miniature proportions having length and diameter dimensions within a range of ½ inch maximum for transmitting rotation from an externally operable shaft through the wall of a sealed casing to a driven part sealed within said casing, said coupling comprising: a housing adapted to be sealed in said casing wall, said housing having inner and outer end members provided with respective central bearings; a seal unit comprising a coupling part and a bellows having a wall film of substantially uniform tissue thinness in the range of .005 inch maximum and .0002 inch minimum, said film being of chemically deposited metal and said bellows having its inner end secured and sealed to said coupling part and its outer end secured and sealed to said housing; an externally operable drive shaft unit including a shaft journalled and axially slidable in said outer end member bearing and having a crank on its inner end, said crank being pivotally coupled to said coupling part; and a driven shaft unit comprising a shaft journalled and axially slidable in said inner end member bearing and extending into the inner end portion of said housing, and means, on the inward end of said driven shaft unit, having a rotary drive-receiving connection with said coupling part, said bellows and coupling part cooperatively sealing said driven shaft unit within said housing, and said coupling part transmitting both rotary drive and axially sliding movement from said drive shaft to said driven shaft.

13. A hermetically sealed shaft coupling of miniature proportions having length and diameter dimensions within a range of one inch maximum for transmitting rotation from an externally operable shaft through the wall of a sealed casing to a driven part sealed within said casing, said coupling comprising: a housing adapted to be sealed in said casing wall, said housing having inner and outer end members provided with respective central bearings; a seal unit comprising a coupling part having a bearing socket open toward said outer end member and a bellows having a metallic wall film of substantially uniform tissue thinness in the range of .005 inch maximum and .0002 inch minimum within the group including nickel, nickel phosphorus alloys, cobalt, nickel-cobalt alloys, and cobalt-phosphorus alloys, said bellows having its inner end secured and sealed to said coupling part and its outer end secured and sealed to said housing; an externally operable drive shaft unit including a shaft journalled in said outer end member bearing and having a crank on its inner end, said crank being received in said socket and thus pivotally coupled to said coupling part; and a driven shaft unit comprising a shaft journalled in said inner end member bearing and extending into the inner end portion of said housing, and means, on the inward end of said driven shaft unit, having a rotary drive-receiving connection with said coupling part, said bellows, outer end member and coupling part cooperatively sealing said driven shaft unit within said housing.

14. A coupling as defined in claim 12, wherein said last means comprises a head of cylindrical cup form receiving the inner end portion of said bellows and having circular bearing lands at its respective ends, said housing having a cylindrical inner wall with which said lands are in rotatable and axially slidable bearing engagement.

15. A hermetically sealed shaft coupling of miniature proportions having length and diameter dimensions within a range of one inch maximum and down to as small as ⅛ inch minimum, for transmitting rotation from an externally operable shaft through the wall of a sealed casing to a driven part sealed within said casing, said coupling comprising: a housing adapted to be sealed in said casing wall, said housing having inner and outer end members provided with respective bearings; a seal unit comprising a coupling part and a bellows of extremely high flexibility embodying a chemically deposited metallic wall film of substantially uniform tissue thinness in the range of .0015 inch maximum and .0005 inch minimum within the group including nickel-phosphorus and cobalt-phosphorus alloys, said bellows having its inner end sealed to said coupling part and its outer end sealed to said outer end member and the latter sealed to said housing; an externally operable drive shaft unit including a shaft journalled in said outer end member bearing and having on its inner end a crank pivotally coupled to said coupling part, and a driven shaft unit comprising a shaft journalled in said inner end member bearing and extending into the inner end portion of said housing, and means, on the inward end of said driven shaft unit, having a rotary drive-receiving connection with said coupling part, said bellows, outer end member, and coupling part cooperatively sealing said driven shaft unit within said housing.

16. A coupling as defined in claim 15, wherein said housing has a cylindrical internal wall, said bellows is of conical form, with its smaller end sealed to said coupling part, and said driven shaft has on its inner end a head of cylindrical cup form including a cylindrical skirt in rotatable bearing engagement with said internal wall of said housing, the smaller end portion of said bellows being received within said skirt.

References Cited in the file of this patent
UNITED STATES PATENTS

| | | |
|---|---|---|
| 2,454,340 | Reichel | Nov. 23, 1948 |
| 2,697,356 | Knudsen | Dec. 21, 1954 |
| 2,707,882 | Kent | May 10, 1955 |
| 2,770,139 | Shen et al. | Nov. 13, 1956 |
| 2,860,933 | Wolf | Nov. 18, 1958 |
| 2,912,864 | Hurlbert et al. | Nov. 17, 1959 |
| 2,978,914 | Gut | Apr. 11, 1961 |
| 3,010,326 | Koning | Nov. 28, 1961 |